United States Patent
Haynam et al.

(10) Patent No.: US 12,025,038 B2
(45) Date of Patent: Jul. 2, 2024

(54) CONNECTOR SYSTEM FOR AN EXHAUST EXTRACTION SYSTEM, A NOZZLE AND THE USE OF SUCH NOZZLE

(71) Applicant: Nederman Holding AB, Helsingborg (SE)

(72) Inventors: Travis Haynam, Mason, OH (US); Robert Newcomb, Cornelius, NC (US)

(73) Assignee: NEDERMAN HOLDING AB, Helsingborg (SE)

( * ) Notice: Subject to any disclaimer, the term of this patent is extended or adjusted under 35 U.S.C. 154(b) by 0 days.

(21) Appl. No.: 17/767,973

(22) PCT Filed: Oct. 9, 2020

(86) PCT No.: PCT/EP2020/078412
§ 371 (c)(1),
(2) Date: Apr. 11, 2022

(87) PCT Pub. No.: WO2021/074031
PCT Pub. Date: Apr. 22, 2021

(65) Prior Publication Data
US 2024/0093626 A1 Mar. 21, 2024

(30) Foreign Application Priority Data
Oct. 16, 2019 (EP) .................................... 19203531

(51) Int. Cl.
*F01N 13/18* (2010.01)
*B08B 15/00* (2006.01)
(Continued)

(52) U.S. Cl.
CPC .......... *F01N 13/082* (2013.01); *B08B 15/002* (2013.01); *F01N 13/1844* (2013.01);
(Continued)

(58) Field of Classification Search
CPC ............. F01N 13/1827; F01N 13/1838; F01N 13/1844; F01N 2450/10; F01N 2450/18; F16L 37/004
See application file for complete search history.

(56) References Cited

U.S. PATENT DOCUMENTS 5,096,230 A * 3/1992 Pausch .................. F16L 37/004
285/9.1
5,330,234 A 7/1994 Sweeny
(Continued)

FOREIGN PATENT DOCUMENTS

| WO | 2011/045399 A2 | 4/2011 |
| WO | 2011/045399 A3 | 5/2012 |

OTHER PUBLICATIONS

International Search Report and Written Opinion mailed on Feb. 16, 2021, received for PCT Application PCT/EP2020/078412, Filed on Oct. 9, 2020, 11 pages including English Translation.

Primary Examiner — Jonathan R Matthias
(74) Attorney, Agent, or Firm — XSENSUS LLP (57) ABSTRACT

A connector system includes an adaptor with a magnetic target surface, and a nozzle that is configured to be connected to the magnetic target surface of the adaptor by a magnetic coupling. The nozzle has a housing having an inlet end and an outlet end, and a throughgoing channel having an axial extension therebetween. The housing includes one or more magnets that are arranged at the inlet end and configured to direct or indirect engage the magnetic target surface in a condition when the nozzle is connected to the adaptor. Further, the housing includes one or more air vents that are arranged at the outlet end and which have an axial extension being radially displaced in view of the axial extension of the throughgoing channel.

18 Claims, 4 Drawing Sheets

(51) Int. Cl.
*F01N 13/08* (2010.01)
*F16L 37/00* (2006.01)

(52) U.S. Cl.
CPC ........ *F16L 37/004* (2013.01); *F01N 2270/02* (2013.01); *F01N 2450/10* (2013.01); *F01N 2450/18* (2013.01)

(56) References Cited

U.S. PATENT DOCUMENTS

| | | |
|---|---|---|
| 5,466,900 A | 11/1995 | Knapp |
| 5,609,298 A | 3/1997 | Hyslop |
| 5,927,759 A | 7/1999 | Hyslop |
| 7,104,881 B1 * | 9/2006 | Hyslop ................. B08B 15/00 285/24 |
| 2008/0184702 A1 | 8/2008 | Schnackenberg et al. |
| 2008/0296891 A1 | 12/2008 | Hyslop |
| 2009/0250922 A1 * | 10/2009 | Rossman ................ F16L 25/14 239/289 |
| 2010/0066082 A1 * | 3/2010 | Aubert ................. F16L 37/004 454/339 |

* cited by examiner

Fig 1

CONNECTOR SYSTEM FOR AN EXHAUST EXTRACTION SYSTEM, A NOZZLE AND THE USE OF SUCH NOZZLE

CROSS-REFERENCE TO RELATED APPLICATIONS

The present application is based on PCI filing PCT/EP2020/078412, filed Oct. 9, 2020, which claims priority to EP 19203531.9, filed Oct. 16, 2019, the entire contents of each are incorporated herein by reference.

TECHNICAL FIELD

The present invention refers to a connector system for an exhaust extraction system, a nozzle and also the use of such nozzle in an exhaust extraction system.

TECHNICAL BACKGROUND

Emergency vehicles are typically parked in garages or at the station when not in used. Even when parked, there is a lot of work going on in and around the vehicle that requires the engine to be running for extended periods of time. The thus generated exhaust gas must be vented. This is typically made by the tail pipe being connected to an exhaust extraction system via a connector system. In case of an emergency, the connector system must allow a quick release from the tail pipe. The release is typically made by the vehicle driving away which disengages a locking engagement between a first part of the connector system that is permanently attached to the tail pipe and a second part of the connector system that is attached to a flexible hose forming part of the exhaust extraction system. This kind of systems are well known in the art. One example is found in U.S. Pat. No. 9,243,734 and another example is found in U.S. Pat. No. 5,927,759. Both these prior art systems use a magnetic engagement between the first and second parts. Magnetic engagement is easy to use since there is no need for any wiring or the like. Still, there is a problem with the magnets being damaged over time due to the heat of the exhaust gases. Exhaust gases from a diesel engine typically have a temperature around 370° C. (700° F.) and sometimes even higher. It is in fact a tendency that the temperature will be even higher in the future with more fuel-efficient engines. The high temperature does not only have a negative impact on the magnets but also to the flexible hose arrangement that connects to the second part. As a measure to reduce the temperature of the exhaust gases, it is known to intermix air from the ambience with the stream of exhaust gas coming from the tail pipe. This is typically made by providing the first or the second part with a membrane which opens automatically as a result of the suction force applied by the exhaust extraction system. Thereby a stream of cooler air is intermixed with the stream of hot exhaust gas. There is however a need for an even better cooling to prolong the overall life length of the connector system as such and also of the flexible hose arrangement.

SUMMARY

One object of the present invention is to provide a connector system for an exhaust extraction system that allows cooling of the magnets forming part of the magnetic coupling to thereby allow a prolonged life length of the magnets.

Another object is to provide a connector system that allows a combined cooling of not only the magnets but also intermixing of cooling air with the hot exhaust gases leaving the tail pipe.

Yet another object is to provide a nozzle of a connector system that is easy to mount to vehicles, and even without the need for any adaptor to be connected to the tail pipe of the vehicle.

According to a first aspect, a connector system for an exhaust extraction system is provided. The connector system comprises:

an adaptor configured to be connected to a tail pipe of a vehicle, the adaptor comprising a magnetic target surface; and a nozzle forming part of the exhaust extraction system and the nozzle being configured to be connected to the magnetic target surface of the adaptor by a magnetic coupling;

said nozzle comprising a housing having an inlet end and an outlet end, and a throughgoing channel having an axial extension between the inlet end and the outlet end, and wherein said housing comprises:

one or more magnets that are arranged at the inlet end, said magnets being configured to direct or indirect engage the magnetic target surface of the adaptor in a condition when the nozzle is connected to the adaptor; and one or more air vents that are arranged at the outlet end and which are radially displaced in view of the axial extension of the throughgoing channel.

Accordingly, a connector system is provided which comprises an adaptor and a nozzle which are configured to engage each other by a magnetic coupling. A quick release is thereby allowed, simply by a releasing acting moment which is provided when driving away with the vehicle.

In the context of the invention, a direct engagement with the magnetic target surface is to be understood as that the magnet is configured to physically engage the magnetic target surface without any intermediate element. On the contrary, an indirect engagement with the magnetic target surface is to be understood as that there may be an element arranged between the magnet and the magnetic target surface. Such element may by way of example be a wall portion of the nozzle or a cover of the magnetic target surface.

The one or more magnets are arranged at the inlet end of the housing while the one or more air vents are arranged at the outlet end of the housing. By the one or more magnets being arranged opposite the one or more air vents, the ambient air that is allowed to enter the housing via the one or more air vents will pass the one or more magnets before leaving the housing via the outlet end. Since the one or more air vents are arranged at the outlet end, ambient air is drawn from a cooler place than if the air vents instead where to be arranged at the inlet end adjacent the tail pipe. The ambient air flow is generated by the suction applied by a suction source forming part of an exhaust extraction system to be connected to the nozzle. By the design of the housing, the air flow changes its direction more or less 180 degrees during its passage through the housing from the air vents to the throughgoing channel. Thereby the residence time in the housing and hence the contact with the magnets is substantially increased as compared to a design where the at least one air vent and the at least one magnet are arranged at the same end, i.e. the inlet end. The supplied flow of ambient air having a lower temperature accordingly serves a dual purpose of cooling the magnet(s) and intermixing with and reducing the temperature of the exhaust gas. Accordingly, the design of the nozzle results in a connector system having a prolonged life length in view of the functionality of the magnets and further in view of the flexible hose to be connected to the nozzle.

The one or more air vents may be circumferentially arranged around the throughgoing channel of the nozzle as seen in a plane extending transverse to the longitudinal centerline of the throughgoing channel. In case of a plurality of air vents, these may be symmetrically arranged around the circumference.

The one or more air vents may have an axial extension that is aligned with or which forms an angle to the longitudinal centerline of the throughgoing channel.

The one or more air vents may be axially aligned with the one or more magnets. Alternatively, the one or more air vents may be arranged further away from a longitudinal centerline of the throughgoing channel of the nozzle than the one or more magnets as seen in a plane extending transverse to the longitudinal centerline of the throughgoing channel. Thereby the ambient air having a substantially lower temperature than the exhaust gas will pass the magnet(s) on its way from the one or more air vents towards the outlet end of the housing before intermixing with the exhaust gas. Thereby the temperature of the magnets(s) will be reduced and their life length prolonged.

The one or more air vents may be provided with an openable membrane which is configured to be set to an open condition by a suction force to be generated when operating the exhaust extraction system, thereby allowing the throughgoing channel of the nozzle to be set in communication with the ambience via the one or more air vents. The suction force results in a vacuum in the housing which forces the membrane to open.

The openable membrane may be provided as an openable flap or as a slit diaphragm. The openable membrane acts as a check valve that allows ambient air of a lower temperature to enter the housing, while at the same time preventing exhaust gas from exiting there through. The openable membrane is configured to be set to its open position by the suction force generated by a suction source forming part of the exhaust extraction system.

The throughgoing channel may be centrally arranged in the nozzle.

An exterior wall portion of the housing configured to face the magnetic target surface of the adaptor may be provided with a flexible lip. The flexible lip preferably has a circumferential extension to thereby contribute to maintaining the vacuum in the housing and hence contribute to the setting of the openable membrane to its open position. The flexible lip is preferably arranged in a position radially outside the position of the one or more magnets.

The adaptor may be provided with a cone-shaped protrusion and the nozzle be provided with a complementary cone-shaped receiving portion. Alternatively, the nozzle may be provided with a cone-shaped protrusion and the adaptor be provided with a complementary cone-shaped receiving portion. The cone-shape contributes to a guiding effect when moving the nozzle into engagement with the adaptor of the tail pipe and hence contributes to a strong magnetic coupling. This also allows for a reduced surface area and hence size of the magnetic target surface An exterior surface of the housing may be provided with an impact bumper. The impact bumper may be provided with at least one indent. Since the magnetic coupling is configured to be released by driving away with the vehicle, a swing back effect may occur as a result of the flexible hosing being temporarily extended before the magnetic coupling is released. This may result in the nozzle hitting objects in and around the area in a manner that is hard to control. By providing the exterior surface of the housing with an impact bumper, the energy will at least to some extent be absorbed by the impact bumper. The provision of at least one indent is a measure to reduce weight of the nozzle and hence the momentum. The indents may also, depending on their design, contribute to energy absorption.

In case of a plurality of magnets, these may be more densely arranged around a lower edge portion of the inlet end of the nozzle.

According to another aspect, a nozzle configured to form part of an exhaust extraction system and to be connected directly or indirectly to a tail pipe of a vehicle by a magnetic coupling is provided. The nozzle comprises a housing having an inlet end and an outlet end, and a throughgoing channel having an axial extension between the inlet end and the outlet end, and wherein said housing comprises:

one or more magnets that are arranged at the inlet end, said magnets being configured to engage a magnetic target surface of a vehicle; and one or more air vents that are arranged at the outlet end and which have an axial extension being radially displaced in view of the axial extension of the throughgoing channel.

The nozzle and advantages provided by the same have been thoroughly discussed above. To avoid undue repetition, reference is made to that discussion. That information is equally applicable to the nozzle as a standalone part.

The one or more air vents may be circumferentially arranged around the throughgoing channel of the nozzle as seen in a plane extending transverse to the longitudinal centerline of the throughgoing channel.

The one or more air vents may be axially aligned with the one or more magnets. Alternatively, the one or more air vents may be arranged further away from a longitudinal centerline of the throughgoing channel of the nozzle than the one or more magnets as seen in a plane extending transverse to the longitudinal centerline of the throughgoing channel.

According to yet another aspect, the invention refers to the use of a nozzle according to any of claims 10-12 in an exhaust extraction system.

Further objects and advantages of the connector system and the nozzle will be obvious to a person skilled in the art reading the detailed description given below describing different embodiments.

BRIEF DESCRIPTION OF DRAWINGS

The invention will be described in detail with reference to the schematic drawings.

DETAILED DESCRIPTION

Figure 1:
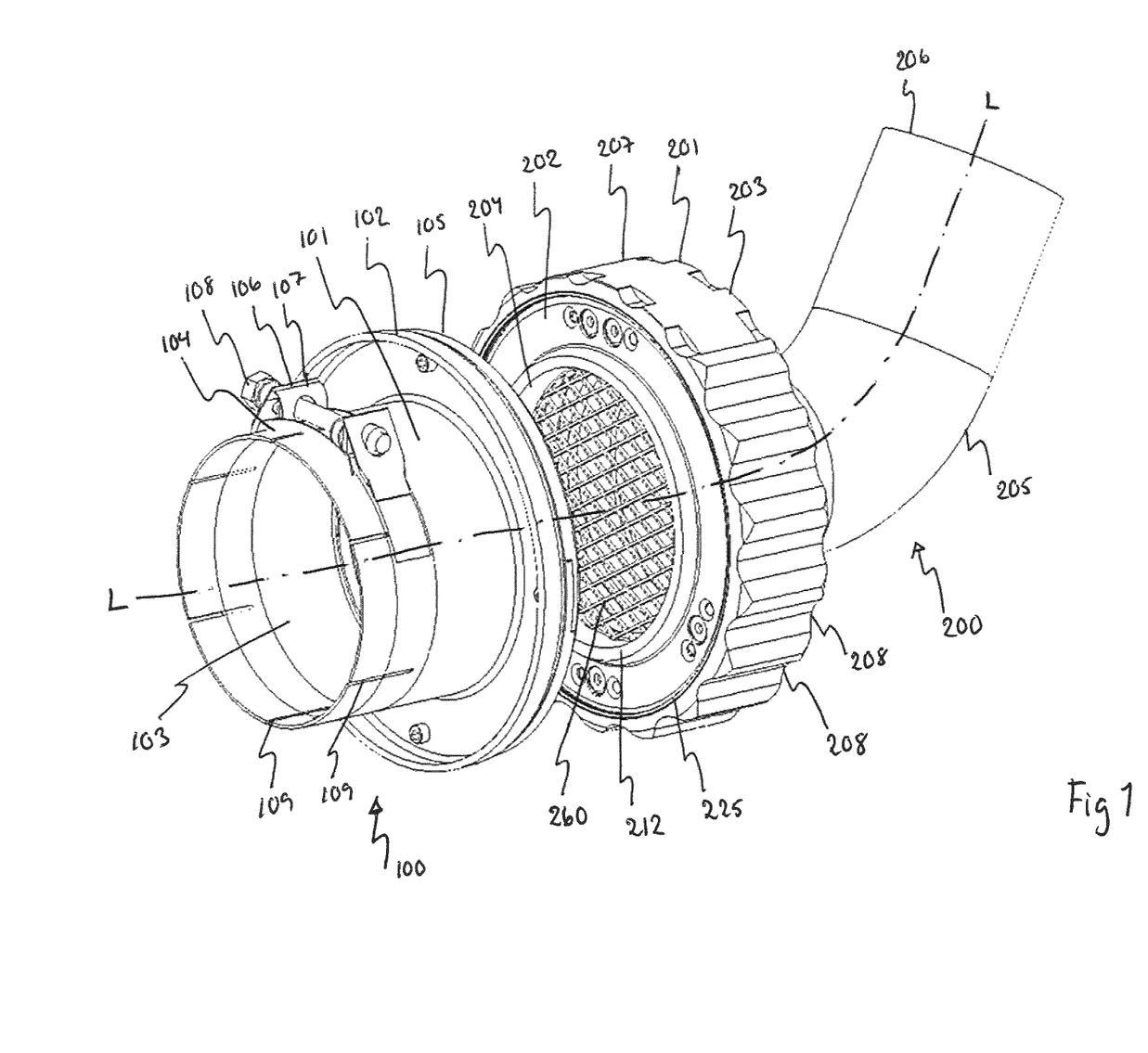
FIG. 1 discloses a connector system for an exhaust extraction system as seen from the inlet end.
Figure 2:
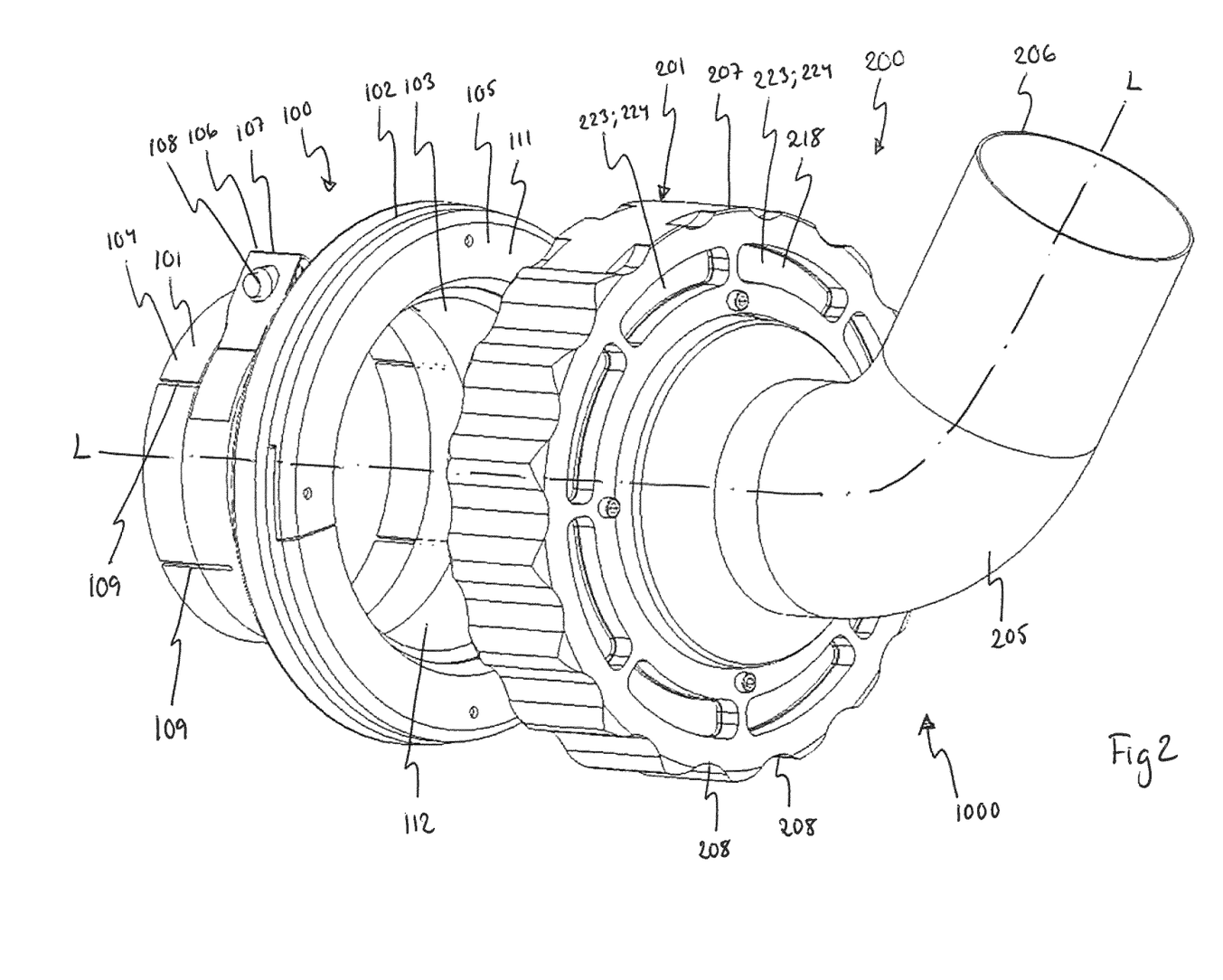
FIG. 2 discloses the connector system for an exhaust extraction system as seen from the outlet end.

Now turning to FIGS. 1 and 2 one embodiment of a connector system 1000 for an exhaust extraction system is disclosed. The connector system 1000 comprises two main components—an adaptor 100 and a nozzle 200. To facilitate understanding, the adaptor 100 and the nozzle 200 are disclosed in a separated condition.

The adaptor 100 is configured to be permanently connected to the free end of a non-disclosed tail pipe of a vehicle. The adaptor 100 comprises a tube portion 101 and a flange portion 102 which together define a longitudinally extending throughgoing channel 103. The tube portion 101 and the flange portion 102 may be formed by sheet metal and may be formed as two or more joined parts or as an integral body.

The tube portion 101 comprises an inlet end 104 configured to face the tail pipe. The flange portion 102 comprises an outlet end 105 configured to face the nozzle 200.

The tube portion 101 is configured to be slid onto the exterior envelope surface of the free end of the tail pipe. The tube portion 101 supports a locking arrangement 106 which is configured to provide a locking engagement between the adaptor 100 and the tail pipe. The locking arrangement 106 is provided as a hose clamp 107, which as such is well known in the art. By setting a bolt or screw 108 of the hose clamp 107, the diameter of the tube portion 101 is reduced to thereby clamp around the tail pipe. To facilitate the clamping, the tube portion 101 is provided with a plurality of longitudinally extending slits 109.

Figure 3:
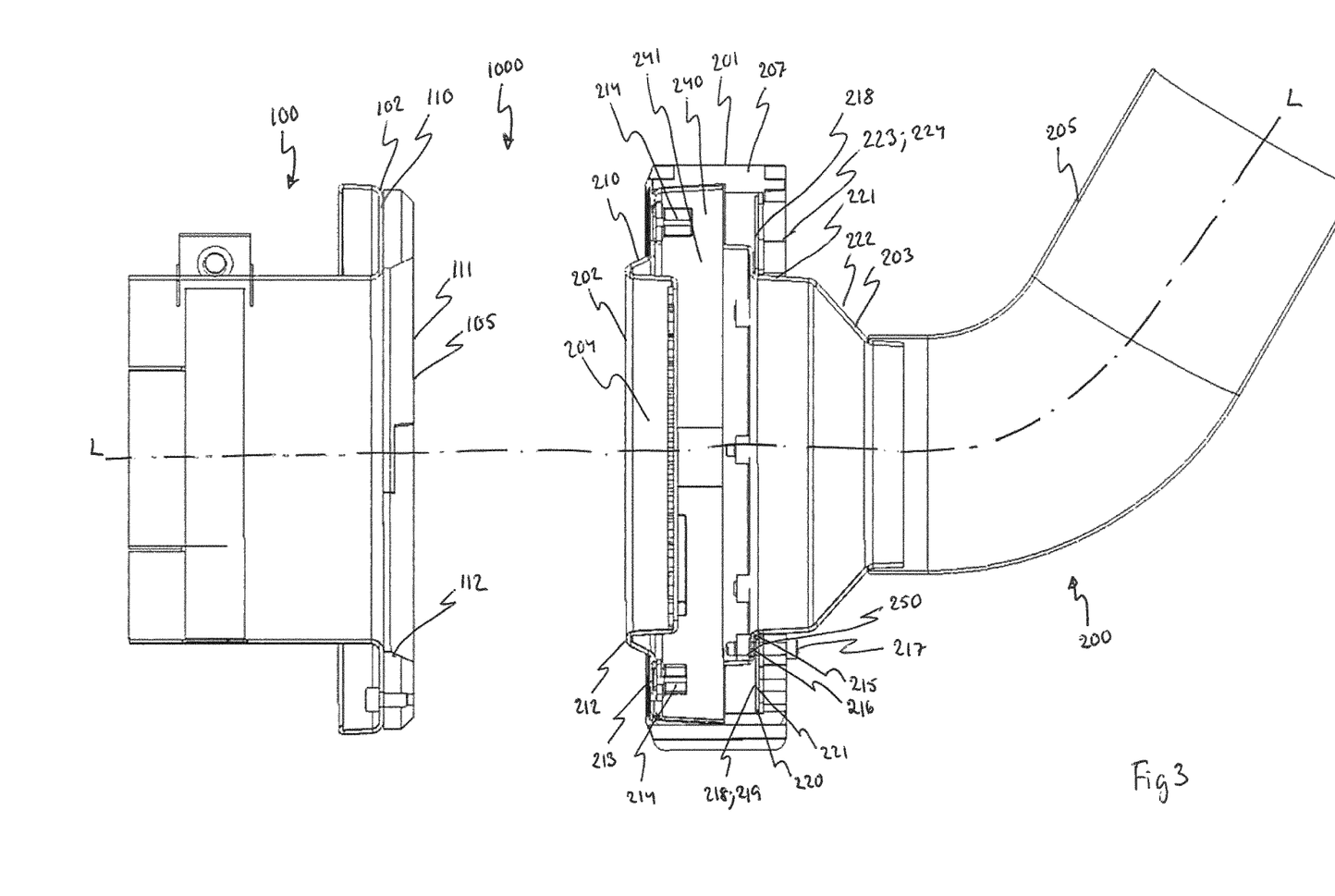
FIG. 3 discloses a cross section of the connector system as seen along a longitudinal centerline.

As is best seen in FIG. 3, the flange portion 102 comprises a radially extending flange 110 encircling the outlet end 105 of the adaptor 100. The flange portion 102 may be formed by a metal material to thereby form a magnetic target surface 111. Alternatively, the magnetic target surface 111 may, as is illustrated, be provided as a separate part that is joined to, and thereby supported by the flange portion 102. The joining may be made by bolting, screwing, riveting or even adhesive.

The magnetic target surface 111 is preferably a generally flat surface, see FIG. 3, to thereby facilitate engagement with the nozzle 200. A flat surface in this context is to be understood as a surface substantially free from any surface irregularities. Accordingly, it is preferred that any connecting means used to connect the magnetic target surface 111 to the flange portion 102 are received in countersunk holes.

The magnetic target surface 111 is configured to form part of a magnetic coupling to be described below.

The throughgoing channel 103 has a circular cross section. Other cross sections are possible with remained function. It is preferred that at least the tube portion 101 has a cross section that is complementary to the tail pipe.

The skilled person will understand that other locking arrangements than a hose clamp are equally applicable with remained function.

In the following the nozzle 200 will be discussed. The nozzle 200 comprises a housing 201 having an inlet end 202 and an outlet end 203 and a throughgoing channel 204 having an axial extension between the inlet end 202 and the outlet end 203. The throughgoing channel 204 is centrally arranged in the nozzle 200. It goes without saying that in a condition when the nozzle 200 is magnetically connected to the adaptor 100, the throughgoing channel 204 of the nozzle 200 is aligned with the throughgoing channel 103 of the adaptor 100.

The inlet end 202 is configured to face the outlet end 105 of the adaptor 100. The outlet end 203 is in the disclosed embodiment connected to a bend 205. The bend 205 may be integral with the nozzle 200 or be a component to be mounted thereto. The bend 205 may even be omitted.

In use, the outlet end 203 of the nozzle 200 is configured to be directly or indirectly connected to a non-disclosed exhaust extraction system via a non-disclosed hosing. The bend 205 is used to connect the nozzle to the hose which typically is suspended in the ceiling. Further, the bend 205 contributes to providing an active moment when releasing the magnetic coupling. Accordingly, depending on the use of a bend 205 or not, the connection to the hose may be direct via the outlet end 203 of the nozzle 200 or indirect via an outlet end 206 of the bend 205. In the disclosed embodiment the outlet end 206 of the bend 205 is configured to be connected to the hose. The hose is preferably of the flexible type.

An exterior surface of the housing 201 is provided with an impact bumper 207. The impact bumper 207 may be provided by a flexible material, such as rubber. In the disclosed embodiment, the impact bumper 207 is provided with a plurality of indents 208. The impact pumper contributes to provide a closed cavity to the housing 201.

In the disclosed embodiment, the inlet end 202 is provided with an optional protective mesh 260.

Now specifically turning to FIG. 3, a cross section of the connector system 1000 is disclosed as seen along the longitudinal centerline L. The housing 201 comprises two halves—a first half 210 facing the inlet end 202 and a second half 211 facing the outlet end 203. The two halves 210; 211 are encircled by the impact bumper 207. The two halves 210, 211 together with the impact bumper 207 defines a cavity 240 that is radially displaced in view of the throughgoing channel 204 which extends between the inlet end 202 and the outlet end 203. The cavity 240 is arranged to communicate with the throughgoing channel 204 via a circumferentially extending gap 241 between the first and second halves 210, 211. The impact pumper 207 contributes to provide a closed cavity 240.

The first half 210 comprises a cone shaped protrusion 212 at the inlet end 202. The adaptor 100 comprises a complementary cone-shape receiving portion 112. The cone-shape contributes to a guiding effect when moving the nozzle 200 into engagement with the adaptor 100 to thereby form the magnetic coupling. It is to be understood that alternatively, and with remained function, the nozzle may be provided with a cone-shaped receiving portion and the adaptor be provided with a complementary cone-shaped protrusion.

The first half 210 further comprises a radially extending support surface 213 at the inlet end 202. The support surface 213 extends in a plane extending substantially transverse to the longitudinal extension of the throughgoing channel 204 and also in parallel with the magnetic target surface 111 of the adaptor 100. Accordingly, the support surface 213 has a radial extension complementary to the magnetic target surface 111. The support surface 213 supports magnets 214.

The magnets 214 are in the disclosed embodiment arranged on the interior wall portion of the radially extending support surface 213 and hence inside the housing 201. The magnets 214 are configured to directly or indirectly engage the magnetic target surface 111 in a condition when the nozzle 200 is connected to the adaptor 100 to thereby form a magnetic coupling.

In the disclosed embodiment where the magnets 214 are arranged on the inner wall portion of the housing 201 an indirect magnetic coupling is provided for between the adaptor 100 and the nozzle 200. In another, non-disclosed embodiment, the magnets may be arranged on the exterior wall portion of the housing or in throughgoing channels or even indents in the exterior wall portion. In such embodiment, a direct magnetic coupling with the magnetic target surface of the adaptor will be provided in a condition when the nozzle is connected to the adaptor.

The second half 211 of the housing 201 comprises a flange portion 215 which forms an abutment surface configured to abut an inner wall portion of the impact bumper 207. A through-going hole 216 extends through the flange portion 215 and the impact bumper 207 in order to receive a bolt 217.

An openable membrane 218 is mounted in the interface between the flange portion 215 of the housing 201 and the inner wall portion of the impact bumper 207. In the disclosed embodiment the openable membrane is provided as a flexible, thin disc 219 which encircles the throughgoing channel 204 of the nozzle 200 and which is secured by the bolts 217. The openable membrane 218 has a radial extension. An outer edge portion 220 of the openable membrane 218 abuts an inner abutment surface 221 of the impact bumper 207. The openable membrane 218 may be provided by a thin flexible material such as a silicon or rubber material.

Accordingly, an outer edge portion 220 of the disc-shaped openable membrane 218 is free while its inner edge portion 250 is fixed. Thereby the outer edge portion 220 is a free end which is pivotable in view of its inner edge portion 250. Thus, the outer edge portion 220 is pivotable to act as an openable and closable flap.

An opposite end of the second half 211 comprises a funnel-like connection portion 222 configured to lockingly engage with either the bend 205 or directly with the non-disclosed hose.

As is best seen in FIG. 2, the housing 201 comprises a plurality of air vents 223. The air vents 223 are arranged adjacent the outlet end 203 of the housing 201 and are arranged to extend in the longitudinal direction L through a radially extending wall portion of the impact bumper 207. The air vents 223 are provided as a plurality of throughgoing openings 224. The air vents 223 are circumferentially arranged around the throughgoing channel 204 of the nozzle 200 as seen in a plane extending transverse to the longitudinal centerline L of the throughgoing channel 204. Although a plurality of air vents 223 are provided in the disclosed embodiment, it is to be understood that it with remained function may be sufficient with one air vent only. In case of a plurality of air vents 223, these may be symmetrically arranged around the circumference as disclosed in FIG. 2. The cross section of the individual air vents 223 may differ.

As is best seen in FIG. 3, the respective openings 224 of the air vents 223 facing the cavity 240 of the housing 201 are covered by the openable membrane 218.

As is best seen in FIG. 3, the air vents 223 are substantially axially aligned with the magnets 214. Alternatively, the one or more air vents 223 may be arranged further away from a longitudinal centerline L of the throughgoing channel 204 of the nozzle 200 than the one or more magnets 214 as seen in a plane extending transverse to the longitudinal centerline L of the throughgoing channel 204.

In case of a plurality of magnets 214, these may, as is seen in FIG. 1 be more densely arranged around a lower edge portion of the inlet end 202 of the nozzle 200.

As is also seen in FIG. 1, the exterior wall portion of the housing 201 configured to face the magnetic target surface 111 of the adaptor 100 is provided with an optional flexible lip 225. The flexible lip 225 may be integral with the impact bumper 207. Alternatively, the flexible lip 225 may be part of the magnetic target surface 111 or the adaptor 100. No matter position, it is preferred that the flexible lip 225 has a circumferential extension. The flexible lip 225 is preferably arranged in a position radially outside the position of the one or more magnets.

Figure 4:
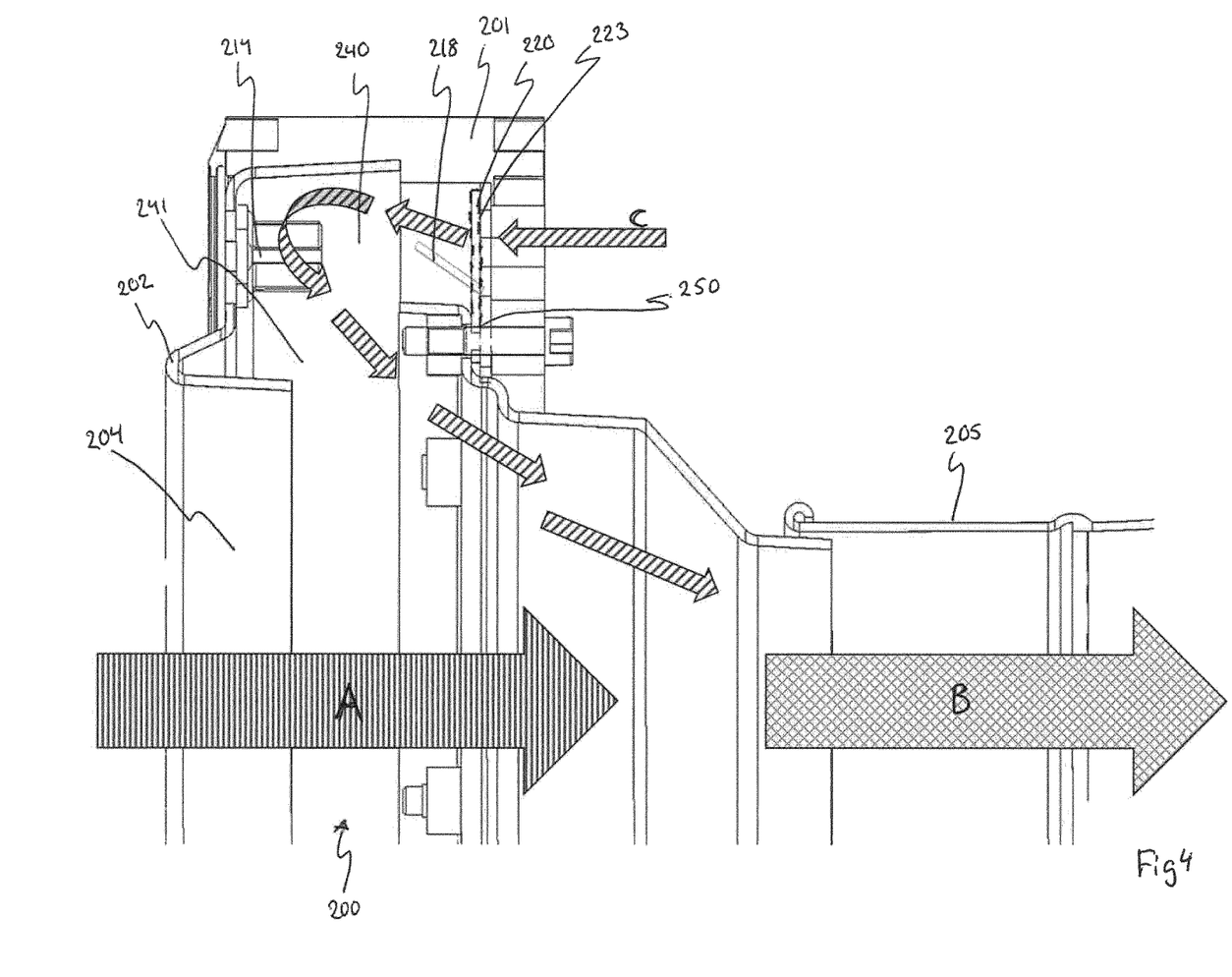
FIG. 4 schematically illustrates the operation of the nozzle when connected to a non-disclosed exhaust extraction system.

Now turning to FIG. 4, the operation of the connector system 1000 will be discussed. To facilitate understanding the adaptor is omitted. The nozzle 200 is connected via the bend 205 to an exhaust extraction system (not disclosed) which comprises an inherent suction source.

In operation, a flow of hot exhaust gas, arrow A, coming from a tail pipe (not disclosed) of a vehicle is schematically illustrated. The flow of hot exhaust gas enters the nozzle 200 via its inlet end 202.

Further, a suction force applied by the suction source of the exhaust extraction system is schematically illustrated as arrow B. Since the cavity 240 of the housing 201 is arranged in communication with the throughgoing channel 204 extending through the nozzle 200, the suction force generates a vacuum in the cavity 240. This vacuum results in that the openable membrane 218 which extends across the opening of each air vent 223 is set to an open position, thereby allowing an inflow of air, see Arrow C, from the ambience into the housing 201. More precisely, since the outer edge portion 220 of the disc-shaped openable membrane 218 is free while the inner edge portion 250 is fixed, the free end of the membrane 218 will open inwardly like a flap as a result of the vacuum. Thereby a passage for the air flow from the ambience into the housing 210 and its cavity 240 is allowed. For better illustration, the openable membrane 218 is disclosed in dashed lines in its closed position, and in solid lines in its open position.

This inflow of air from the ambience, Arrow C, has an initial direction counter to the suction force, Arrow B, and also counter to the flow of exhaust gas, arrow A.

By the one or more magnets 214 being arranged opposite the one or more air vents 223, the ambient air that enters the housing 201 via the one or more air vents 223 will pass the one or more magnets 214 before leaving the cavity 240 via the gap 241. In fact, by the design of the housing 201, the air flow changes its direction more or less 180 degrees during its passage through the cavity 240 from the air vents 223 to the throughgoing channel 204. Thereby the residence time in the cavity 240 and thereby the contact with the magnets 214 is substantially increased as compared to a hypothetic design in which the at least one air vent 223 and the at least one magnet 214 were arranged at the same end. Accordingly, the magnets 214 which are heated by the exhaust gas and by the contact with the adaptor 100 will be efficiently cooled. Thereby their life length will be prolonged.

Further, while the incoming exhaust gas, arrow A, has a temperature of about 370° C., the inflow of air from the ambience, arrow C, is typically at room temperature. Since the two fluid flows intermix when meeting in the throughgoing channel 204, the resulting temperature of the outgoing fluid flow, arrow B, leaving the nozzle 200 will be reduced. Thereby the hose (not disclosed) that is typically used to connect the nozzle 200 to the exhaust extraction system will be subjected to lower temperatures and thereby have a prolonged life length. This also applies to other components downstream the nozzle, such as an exhaust fan. In other words, the supplied flow of ambient air having a substantially lower temperature than the hot exhaust gas serves a dual purpose of cooling the magnet(s) and also intermixing with and reducing the temperature of the exhaust gas. Accordingly, the design of the nozzle results in a connector system having a prolonged life length in view of the functionality of the magnets and in view of the flexible hose to be connected to the nozzle.

The provided connector system comprises an adaptor and a nozzle which are configured to engage each other by a magnetic coupling. Not only is a quick engagement allowed simply by moving the two parts together whereby the magnetic coupling will keep the two parts in a firm engagement, but also a quick release is provided for. The release is allowed by driving away with the vehicle whereby a releasing acting moment is generated which releases the magnetic coupling. The acting moment is enhanced by the bend 205. The skilled person will realize that the bend 205 with remained function may be replaced by a non-disclosed straight tube forming an angle to the longitudinal centerline L of the nozzle 200.

In the embodiment described above, the openable membrane 218 has been disclosed as a flexible disc which acts as an openable flap when subjected to the suction force. Instead of a single membrane that interacts with several air vents, each air vent may be provided with its own openable membrane. The skilled person realizes that the same effect may be provided by a slit diaphragm that is fixedly arranged to the housing and which covers the opening of the one or more air vent. The openable membrane, no matter design acts as a check valve operable by the exhaust extraction system.

The nozzle may be used without any adaptor. In such solution, the magnetic target surface may be provided by a wall portion of the body of a vehicle which wall portion encircles the tail pipe. In such solution, when connecting the nozzle to the body, the tail pipe may be arranged to extend into the throughgoing channel of the nozzle. The flexible lip 225 of the nozzle may be arranged to provide a circumferential sealing against the body preventing exhaust gas from escaping in the radial direction.

In principle one magnet is enough. In case of one magnet only, such magnet may be ring shaped. The material of such ring, as seen in the radial direction, is preferably arranged opposing the at least one air vent.

The nozzle may, in a non-disclosed embodiment, be provided with an air-permeable debris screen. Such screen may be arranged across the inlet opening.

The invention claimed is:

1. A connector system for an exhaust extraction system, the connector system comprising:
   an adaptor configured to be connected to a tail pipe of a vehicle, the adaptor comprising a magnetic target surface; and
   a nozzle forming part of the exhaust extraction system and the nozzle being configured to be connected to the magnetic target surface of the adaptor by a magnetic coupling;
   said nozzle comprising a housing having an inlet end and an outlet end, and a throughgoing channel having an axial extension between the inlet end and the outlet end,
   wherein the nozzle includes a funnel-like connection portion, and
   wherein said housing comprises:
      one or more magnets that are arranged at the inlet end, said magnets being configured to directly or indirectly engage the magnetic target surface of the adaptor in a condition when the nozzle is connected to the adaptor; and
      one or more air vents that are arranged at the outlet end and which are radially displaced in view of the axial extension of the throughgoing channel.

2. The connector system according to claim 1, wherein the one or more air vents are circumferentially arranged around the throughgoing channel of the nozzle as seen in a plane extending transverse to a longitudinal centerline L of the throughgoing channel.

3. The connector system according to claim 1, wherein the one or more air vents are axially aligned with the one or more magnets; or
   wherein the one or more air vents are arranged further away from a longitudinal centerline L of the throughgoing channel of the nozzle than the one or more magnets as seen in a plane extending transverse to the longitudinal centerline L of the throughgoing channel.

4. The connector system according to claim 1, wherein
   the one or more air vents are provided with an openable membrane which is configured to be set to an open condition by a suction force to be generated when operating the exhaust extraction system, thereby allowing the throughgoing channel of the nozzle to be set in communication with ambient air via the one or more air vents.

5. The connector system according to claim 4, wherein the openable membrane is provided as an openable flap or as a slit diaphragm.

6. The connector system according to claim 1, wherein
   the throughgoing channel is centrally arranged in the nozzle.

7. The connector system according to claim 1, wherein
   an exterior surface of the housing is provided with an impact bumper, said impact bumper being provided with at least one indent.

8. The connector system according to claim 1, wherein
   an exterior wall portion of the housing configured to face the magnetic target surface of the adaptor is provided with a flexible lip.

9. The connector system according to claim 1, wherein
   the adaptor is provided with a cone-shaped protrusion and the nozzle is provided with a complementary cone-shaped receiving portion; or
   wherein the nozzle is provided with a cone-shaped protrusion and the adaptor is provided with a complementary cone-shaped receiving portion.

10. The connector system according to claim 1, further comprising a bend,
    wherein the pipe is connected to the outlet end of the nozzle.

11. The connector system according to claim 1, wherein the one or more magnets are arranged within the housing of the nozzle.

12. The connector system according to claim 1, wherein the nozzle is configured to be spaced from the tail pipe for the vehicle, and,
    wherein the adapter includes a hose clamp for connecting to the tail pipe of the vehicle.

13. A nozzle configured to form part of an exhaust extraction system and to be connected directly or indirectly to a tail pipe of a vehicle by a magnetic coupling, the nozzle comprising a housing having an inlet end and an outlet end, and a throughgoing channel having an axial extension between the inlet end and the outlet end,
    wherein the nozzle includes a funnel-like connection portion, and
    wherein said housing comprises:
       one or more magnets that are arranged at the inlet end, said magnets being configured to engage a magnetic target surface of a vehicle; and one or more air vents that are arranged at the outlet end and which have an axial extension being radially displaced in view of the axial extension of the throughgoing channel.

14. The nozzle according to claim 13, wherein the one or more air vents are circumferentially arranged around the throughgoing channel of the nozzle as seen in a plane extending transverse to a longitudinal centerline L of the throughgoing channel.

15. The nozzle according to claim 13, wherein the one or more air vents are axially aligned with the one or more magnets; or
    wherein the one or more air vents are arranged further away from a longitudinal centerline L of the throughgoing channel of the nozzle than the one or more magnets as seen in a plane extending transverse to a longitudinal centerline L of the throughgoing channel.

16. The nozzle according to claim 13, wherein the outlet end of the nozzle is configured to be connected to a bend.

17. The nozzle according to claim 13, wherein the one or more magnets are arranged within the housing of the nozzle.

18. The nozzle according to claim 13, wherein the nozzle configured to be is spaced from the tail pipe for the vehicle, and,
    wherein the adapter includes a hose clamp for connecting to the tail pipe of the vehicle.

* * * * *